United States Patent [19]

Justus

[11] 4,042,503
[45] Aug. 16, 1977

[54] CLASSIFIER AND PROCESS FOR RECYCLED FIBER SEPARATION

[75] Inventor: Edgar J. Justus, Beloit, Wis.

[73] Assignee: Beloit Corporation, Beloit, Wis.

[21] Appl. No.: 551,066

[22] Filed: Feb. 19, 1975

Related U.S. Application Data

[63] Continuation of Ser. No. 423,277, Dec. 10, 1973, abandoned.

[51] Int. Cl.² ............................................. B01D 33/38
[52] U.S. Cl. ........................................ 210/65; 209/240; 209/273; 210/103; 210/137; 210/414; 210/428
[58] Field of Search .............. 210/137, 103, 321, 414, 210/428, 433, 61; 162/55; 209/273, 300, 258, 240

[56] References Cited

U.S. PATENT DOCUMENTS

| | | | |
|---|---|---|---|
| 1,825,631 | 9/1931 | Horvath | 210/137 X |
| 2,983,379 | 5/1961 | Cram | 209/273 |
| 3,074,553 | 1/1963 | Szepan et al. | 209/273 |
| 3,410,409 | 11/1968 | Rittenhouse et al. | 209/273 X |
| 3,511,374 | 5/1970 | Beal | 209/258 |
| 3,616,904 | 11/1971 | Areman | 209/300 X |
| 3,647,067 | 3/1972 | Vogel | 209/306 X |
| 3,672,504 | 6/1972 | Grimes, Jr. | 209/255 |
| 3,874,509 | 4/1975 | Parker et al. | 209/240 |

*Primary Examiner*—Frank A. Spear, Jr.
*Attorney, Agent, or Firm*—Hill, Gross, Simpson, Van Santen, Steadman, Chiara & Simpson

[57] ABSTRACT

A fiber classifying mechanism and method including a first chamber having an inlet for receiving fibers to be classified carried in a fluid suspension and having an outlet from the same chamber. A second chamber receives a controlled split of flow from the first chamber through a screen between the chambers having openings of a size to pass reject fibers. Means are provided for controlling the split of flow by a valve in the outlets from the respective chambers so as to control the flow through the screen. A foil moves past the screen to agitate fibers collected on the surface of the screen.

8 Claims, 3 Drawing Figures

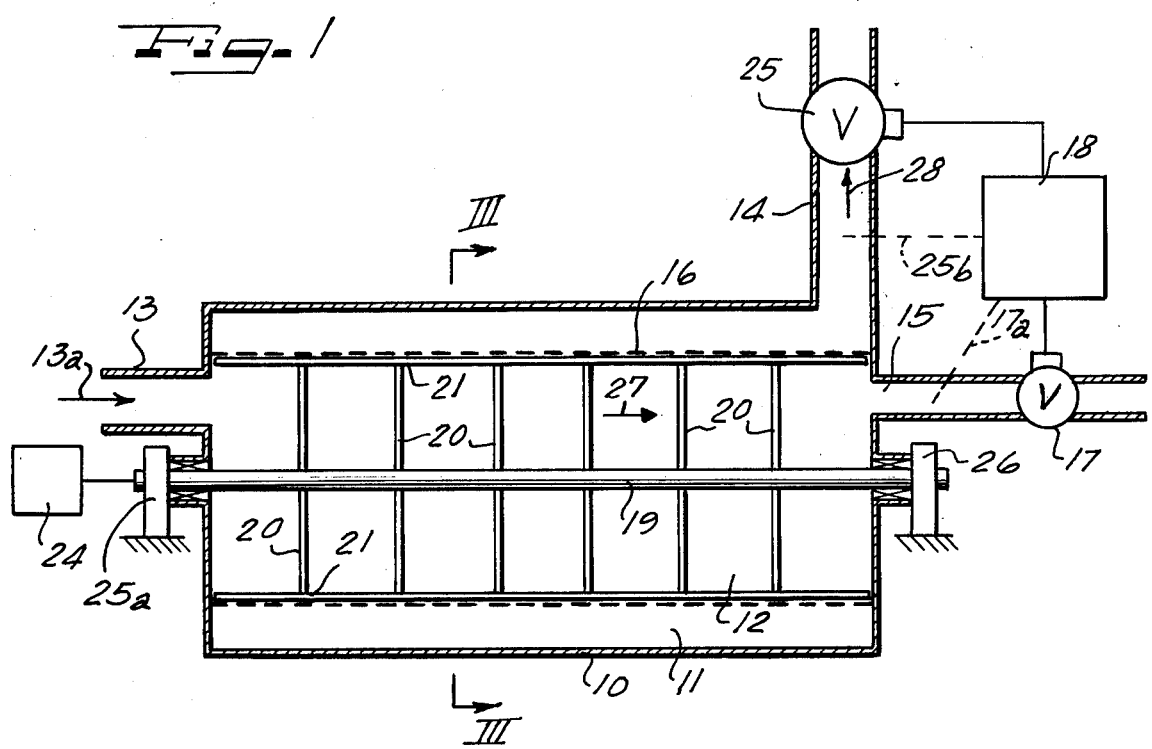
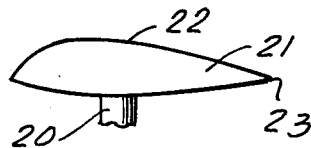
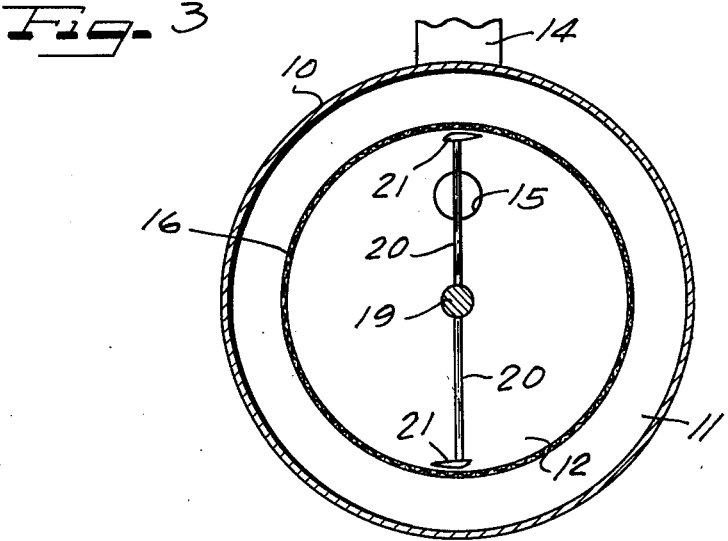

CLASSIFIER AND PROCESS FOR RECYCLED FIBER SEPARATION

This is a continuation of application Ser. No. 423,277 filed Dec. 10, 1973, now abandoned.

BACKGROUND OF THE INVENTION

The present invention relates to improvements in fiber classifying systems and more particularly to a mechanism for handling reclaimed waste fibers and separating the short unusable fibers from the usuable fibers.

In a wastepaper reclamation mechanism, wastepaper is processed usually in a refiner vat where the paper is first immersed in a liquid composition in which the inks and tars are soluble. The paper is then passed through a refiner to separate the fibers, and the fibers in suspension are then in condition for forming a paper web. However, the refined fibers can be substantially upgraded by moving undesirable fines which include fibers too short to have any substantial binding effect on the paper web. In the refining of the paper, short fibrils form on the stems of the longer fibers, and these fibrils fall off to form an abundance of fines. These fines not only do not contribute to the strength and quality of the paper, but detract from its formation in that they block the flow of water as the web is being formed in the dewatering operation.

It is accordingly an object of the invention to provide an improved classifier for use in a recycled fiber preparation which separates nonusuable fines from usable fibers in a continuing operation.

A further object of the invention is to provide a classifier of the type above described which is capable of continued operation in substantial volumes.

An important advantage of the invention is to provide an improved classifier for recycled fiber preparation wherein a proportionate amount of fines removed from the pulp is readily controllable.

A feature of the fiber classification mechanism is to have a controlled split of the flow passing through a screen critical size. For example, a flow is passed through a main chamber which is separated from a second chamber with 25% of the flow passing through a screen therebetween into the second chamber and 75% not going through the screen but continuing on through the first chamber flowing through an outlet. With fine holes in the screen as small as from 0.010 to 0.090, there will be a much higher probability of the fine particles from the stock going through the screen plate. Thus, the 25% effluent passed through the screen will have a much higher concentration of fine fibers than the 75% passing directly through the first chamber.

Other objects, advantages and features, as well as equivalent structures and methods which are intended to be covered herein, will become more apparent with the teaching of the principles of the invention in connection with the disclosure of the preferred embodiment thereof in the specification, claims, and drawings in which:

DRAWINGS

FIG. 1 is a somewhat schematic vertical sectional view taken through a classifier constructed and operating in accordance with the principles of the present invention;

FIG. 2 is an enlarged fragmentary detailed view of a foil; and

FIG. 3 is a somewhat schematic vertical sectional view taken substantially along line III—III of FIG. 1.

DESCRIPTION OF THE PREFERRED EMBODIMENTS

FIG. 1 illustrates a classifier having an annular outer shell 10. Within the shell is an annular inner chamber 12 having an inlet 13 at one axial end. Means are provided, illustrated schematically by the arrow 13a, for delivering a fluid suspension of fibers from a refiner. The fibers preferably are in a water suspension and have had the inks and tars removed, but contain both long and short fibers with fines and short soft fibers, undesirable for use in forming a web from the reclaimed fibers.

As the fluid suspension of fibers enters the first chamber 12, it flows axially along the chamber toward an outlet 15 for acceptable fibers, the flow direction being shown by the arrow 27.

Positioned concentrically outside of the first chamber is a second annular chamber 11 for reject fines. The second chamber has an outlet 14 at the same end of the shell 10 as the outlet 15 so that the liquid within both the chambers 11 and 12 flows axially in the same direction.

Separating the two chambers is an annular screen 16 having openings of a size to block acceptable long fibers but to pass the reject fibers. In a preferred form, the fine screen will have a mesh in the range of 0.010 to 0.090 inch. Preferably the mesh will be kept below 0.040 inch.

The continuing flow of fibers in suspension through the chambers is obtained by a delivery pump which delivers the slurry under pressure. A pressure is maintained in the first chamber, and the outlet flow from the second chamber is controlled. A pressure differential of approximately 5 psi is maintained, although this may be changed with change in flow rate through the first chamber. By controlling the proportionate flow through the reject fiber outlet 14, the passage of fibers through the screen 16 will be controllable. That is, by increasing the proportional flow through the reject outlet 14, the amount of fine fibers passing through the screen 16 will increase thereby upgrading the fibers which flow through the acceptable fiber outlet 15. A valve 17 may be provided to control flow through the outlet 15 to maintain a desirable flow rate through the first inner chamber 12. This, of course, is determined by the output of the pump delivering to the inlet 13. As will be apparent to those versed in the art, differend means may be provided to control flow through the inner first chamber 12 and through the outlet 14 (the flow through outlet 14 is indicated schematically by the arrowed line 28).

For controlling the flow through the outlet 14, a valve 25 is positioned in the reject fiber outlet 14. By control of the valve 25, the ratio of flows taken through the outlets 14 and 15 is controllable. When the flow through the reject fiber outlet 14 is proportionally increased to increase the pressure drop across the screen 16, the amount of fluid passing through the screen increases and more fines are taken through the second chamber. If the fiber outlet 14 size is reduced, the amount of stock flow through the screen 16 will decrease thereby decreasing the amount of fines passing through the screen. It will be appreciated by those versed in the art, a valve also may be provided for inlet 13. However, the drawings show a preferred form where a valve 25 is in the outlet 14 and a valve 17 is in the outlet 15.

For controlling the opening of the valves 25 and 17, a controller 18 is provided. The controller has a motor drive for the valve so that as the valves 25 and 17 require operation for maintaining the desired flow through the screen, the controller will automatically keep the valves in the required positions. The controller may operate by detecting the outlet pressure through the outlets 14 and 15 and then with variation in delivery from the inlet 13, the controller 18 will automatically regulate the valves 25 and 17 to maintain a constant pressure drop across the screen 16. Pressure sensors 17a and 25a may be located upstream of each of the valves and also connected to the controller. The controller may be computer operated and programmed to control flow and pressure drop in accordance with varying factors such as temperature and pressure and may be arranged to have various settings for different types of stock.

The conduit means 15 is connected to conducting the acceptable fibers to a paper making machine. The conduit 14 is connected to the fiber reject outlet for carrying away the reject fines. This may be passed to mechanisms destroying or disposing of the fines.

Within the first chamber is a rotor carrying a plurality of axially extending foils 21. The foils are mounted at the ends of arms 20 carried on a centrally located shaft 19 which is rotatably mounted in end bearings 25a and 26. The shaft is driven in relatively slow rotation by a drive motor 24 at the end of the shaft.

The foils have a general air foil shape as shown in FIG. 2 with a sharp leading edge 23 and a tapered rearwardly leading curved surface 22 which creates an outwardly directed pressure pulse on the screen as the foil passes. Thus, as the shaft 19 rotates, the individual foils pass the openings in the screen creating an outwardly directed pulsation to break up any clumping of fibers which occurs on the outer surface of the screen in the first chamber, thereby continuing the filtering or separation operation. The foils preferably extend the length of the annular screen 16.

In operation reclaimed fibers are obtained from the digester and delivered under pressure through the line 13 to the classifier. The fibers flow into the first chamber 12 within the annular screen 16 with the fine fibers being forced through the screen. As the foil rotates, the fibers are kept agitated so they do not form a mat on the surface of the screen. The long fibers flow axially tumbling over the screen openings so that they are fully separated, and the fines pass through the screen. A certain amount of long fibers will flow through the screen and generally with a proportional flow of 25 percent of the liquid passing through the screen and 75 percent not going through the screen, there is a much higher probability of the fine particles flowing through the screen. Thus, the 25 percent of the effluent passing into the separator will have a much higher concentration of fines than the 75 percent which passes directly through and out the line 15. The pressure differential across the screen and hence the proportionate split of flow is controlled by the opening of the valves 25 and 17. By the time the stock has traveled the full axial length of the classifier, the fines will have had opportunity to pass through the screen 16. The amount of fines separated can be increased by opening the valve 25 to increase the pressure differential across the screen, or by closing valve 17 which has the same effect.

The slurry containing the acceptable and unacceptable fibers is delivered under pressure to the classifier, and this pressure is utilized to push the fines through the screen 16. An increase in rate of flow delivery to the classifier can be accommodated by further opening the valve 25. The proportional divider or controller 18 can be set up to simultaneously operate both the outlet valves 17 and 25.

I claim as my invention:

1. A recycled paper fiber classifying mechanism comprising, in combination:
    a first cylindrical chamber having an inlet for receiving a mixture of acceptable fibers and reject fibers carried in a fluid suspension to be classified, said first chamber having an acceptable fiber outlet;
    a delivery pump connected to said first chamber inlet for delivering a flow of said fibers under pressure in a fluid suspension to said first chamber;
    a second chamber concentrically surrounding and in communication with said first chamber for receiving reject fibers from said first chamber, said second chamber having a reject fiber outlet;
    a cylindrical screen means separating said chambers and having openings of a size in the range of 0.010 to 0.090 inch to pass reject fibers; and
    valve means in said acceptable fiber outlet, and valve means in said reject fiber outlet, each of said valve means being variable for controlling the flow of fluid passing through each of said outlets and thereby controlling the pressure in said first and second chambers for maintaining a predetermined pressure drop across the screen means so as to control the apportionment of fluid through the screen means and through the acceptable fiber outlet and the reject fiber outlet and thereby control the classification of fibers.

2. A recycled paper fiber classifying mechanism constructed in accordance with claim 1 wherein said first and second chambers are positioned so that fluid flow through said chambers toward the respective outlets thereof is in a parallel direction.

3. A recycled paper fiber classifying mechanism constructed in accordance with claim 1 wherein said valve means includes a valve positioned in each of said outlets, each such valve having a controllably variable opening which is variable to proportion the flow through said screen means.

4. A recycled paper fiber classifying mechanism constructed in accordance with claim 3 including a proportional divider for controlling at least one of said valves as a function of the other of said valves.

5. A recycled paper fiber classifying mechanism constructed in accordance with claim 1, including an annular housing surrounding said first chamber; said screen means being of annular shape and substantially concentric with said housing so as to form the first chamber within said screen means, with the second chamber being positioned outwardly of said screen means; and a plurality of rotating foil means positioned within said first chamber and being movable past a surface of said screen means for agitating material collecting on said surface in said first chamber.

6. A recycled paper fiber classifying mechanism constructed in accordance with claim 1 wherein said screen means has openings of a size in the range of 0.010–0.04 inch.

7. A recycled paper fiber classifying mechanism constructed in accordance with claim 1 wherein said screen means is cylindrical in shape and said first and second chambers extend coaxially with said screen means;

wherein said first chamber inlet is located at one end of said screen means; wherein said reject fiber outlet is located at an opposite end of said screen means from said first chamber inlet and said acceptable fiber outlet is located at the same end of the screen means as said reject fiber outlet so that the fiber fluid suspension flows for the full axial length of said screen means form said inlet to said outlets.

8. A method of classifying recycled paper fibers comprising the steps of:

directing a flow of acceptable and reject fibers under pressure by delivery pump in a fluid suspension to be classified into a first cylindrical chamber through an inlet;

removing acceptable fibers through an outlet leading from the first chamber;

passing reject fibers through a cylindrical screen having openings in the range of 0.010 to 0.090 inch to a second chamber concentrically surrounding the screen;

removing reject fibers from an outlet leading from the second chamber;

controlling the flow through the outlets from each of the chambers with valves and thereby controlling the pressure in said first and second chambers for maintaining a predetermined pressure drop across the screen and thereby controlling the apportionment of fluid flowing through the screen and through the acceptable fiber outlet and the reject fiber outlet to control the classification of fibers.

* * * * *